A. H. CHANDESON.
BRAKING MECHANISM.
APPLICATION FILED JULY 8, 1920.

1,434,678.

Patented Nov. 7, 1922.

Inventor
A. H. Chandeson
By H. R. Kerslake.
Atty.

Patented Nov. 7, 1922.

1,434,678

UNITED STATES PATENT OFFICE.

ALFRED HENRI CHANDESON, OF JETTE ST. PIERRE, BELGIUM; SOLE HEIR OF SAID ALFRED HENRI CHANDESON, DECEASED, ASSIGNOR TO COMPAGNIE INTERNATIONALE DE FREINAGE (SYSTEME LUYERS) SOCIETE ANONYME, OF BRUSSELS, BELGIUM.

BRAKING MECHANISM.

Application filed July 8, 1920. Serial No. 394,719.

(GRANTED UNDER THE PROVISIONS OF THE ACT OF MARCH 3, 1921, 41 STAT. L., 1313.)

*To all whom it may concern:*

Be it known that I, ALFRED HENRI CHANDESON, a subject of the King of the Belgians, residing at Jette St. Pierre, Belgium, have invented new and useful Improvements in Braking Mechanism (for which I have filed applications in Belgium No. 262,408, filed Nov. 27, 1913, and Germany filed Nov. 29, 1913, No. 24,148), of which the following is a specification.

This invention relates to braking mechanisms of the type in which brake shoes are adapted to act laterally on a braking member or drum secured to the axle or shaft on which the braking action is to be exerted.

In mechanisms of this kind it is essential that the brake shoes shall be uniformly applied against both sides of the braking member and, furthermore, in order to obtain a quick braking action the shoes should be as near the braking member as possible when in their inoperative positions. The mechanism, moreover, should be reliable and steady in operation, and it should comprise a small number of parts in order to avoid unnecessary complication and weight.

The object of this invention is to provide a braking mechanism that will answer these requirements, while being of a simple, strong and compact structure.

In accordance with the invention the braking member or drum is adapted to be acted upon by two pairs of brake shoes, one on each side of the axle or shaft, and these are operatively connected with rods of unequal lengths pivoted to the ends of a compensating lever which, in turn, is pivoted to an operating lever or member at a point intermediate the ends of said lever but closer to the end connected with the shorter rod.

This arrangement offers the advantage, among others, that it is capable of automatic adjustment so that it will also operate normally with brake shoes of different thicknesses or with shoes in different conditions of wear.

Figure 2:
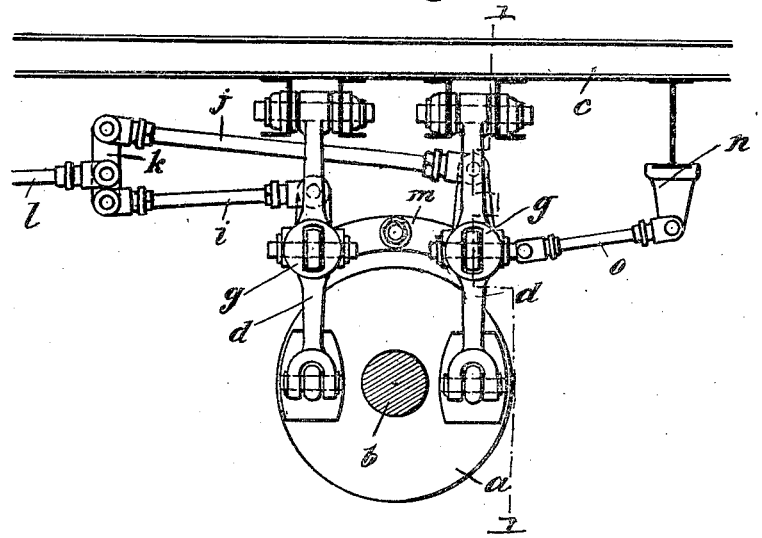
Figure 1:
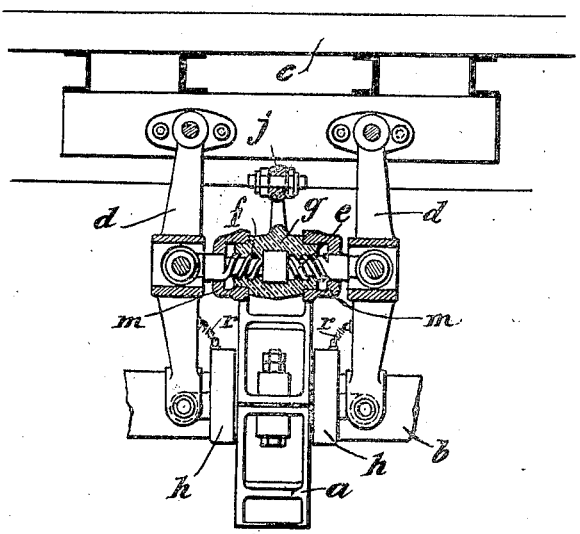

The invention will now be more particularly described with reference to the accompanying drawing in which:

Fig. 1 is a front view of the braking mechanism, partly in section on the broken line 1—1 of Fig. 2, and Fig. 2 is a side elevation of the same.

In the example shown, the braking member or drum $a$ is adapted to be engaged by two pairs of brake shoes $h$ carried by pivoted arms $d$ depending from the frame $c$ of a railway coach. There is provided one pair of arms $d$ on each side of the axle $b$, and the arms of each pair are connected by means of a pair of oppositely threaded screws $e$, $f$ engaged by a sleeve nut $g$, so that the shoes $h$ will be moved towards or away from each other by rotating said nuts in one or the other direction. The brake shoes are held in a vertical position by means of suitable springs $r$.

The screws $e$, $f$ and nuts $g$ are shown to be so constructed and arranged that braking takes place when the two nuts $g$ are rotated in the same direction. The nuts $g$ are respectively connected to rods $i$ and $j$ connected together by a lever $k$ to which is pivoted a rod or bar $l$ adapted to be operated by fluid pressure or the like. The pivotal connection between the rod $l$ and the lever $k$ is intermediate the ends of said lever and, as shown, the distance between said pivotal connection and the head of the rod $i$ for actuating the nut $g$ which is comparatively near, is less than the distance between said pivotal connection and the head of the rod $j$ for actuating the nut $g$ which is farther away. The position of said pivotal connection on the lever $k$ is preferably such that the forces exerted by the rods $i$ and $j$ on their respective nuts shall be equal. Consequently the arms $d$ of both pairs will be acted upon by the screws $e$ and $f$ with equal force and the brake shoes $h$ applied against the drum $a$ with equal pressure. The equal moments of the rods $i$ and $j$ with respect to the axes of the screws $e$ and $f$ remain substantially uniform whatever be the condition of wear of the brake shoes $h$. Thus, if the shoes of one pair should wear out quicker than the others, on account of the metal being softer or for any other reason, the lever $k$ will automatically swing about its connection with the rod $l$ so that the pressure exerted by the two pairs of brake shoes will remain unaltered.

The two nuts $g$ are connected with one another by a pair of braces $m$ and the nut remote from the operating rod $l$ is connected to a bracket $n$ rigid with the frame of the car by means of a pair of rods $o$ for taking up the pull exerted by the operating rod $l$.

In operation, the power applied in any desired manner to the rod $l$ is transmitted by the lever $k$ to the rods $i, j$, which rotate the nuts $g$ so as to move the screws $e, f$ towards each other and apply the brake shoes $h$ against the sides of the drum $a$, the lever $k$ automatically taking up such a position that the two pairs of brake shoes are applied with equal pressure to the drum $a$. When power ceases to be applied to the rod $l$, this rod and the other parts of the mechanism return to their inoperative positions.

I claim:

1. In a braking mechanism, the combination with a braking drum, of two pairs of brake shoes mounted for lateral movement on each side of the axis of said drum, a member for moving the shoes of each pair towards and away from said drum, a rod connected to each of said members, said rods being of unequal lengths, a lever pivotally connected to both rods, and an operating member pivotally connected to said lever at a point intermediate the connections of said lever with said rods.

2. In a braking mechanism, the combination with a braking drum, of two pairs of brake shoes adapted to engage said drum on both sides of its axis, a rod operatively connected with each pair of brake shoes, said rods being of unequal lengths, a lever pivotally connected to both rods, and an operating member pivotally connected to said lever at a point nearer the connection of said lever with the shorter rod.

3. In a braking mechanism, the combination with a frame, of a braking drum, two pairs of hinged arms depending from said frame, brake shoes on said arms adapted to engage said drum on both sides of its axis, oppositely threaded screws connected with the arms of each pair, a nut engaging each pair of screws, a rod operatively connected with each nut, said rods being of unequal lengths, a lever pivotally connected to both rods, and an operating member pivotally connected to said lever at an intermediate point thereof, the lever arm adjacent the shorter rod being shorter than that adjacent the longer rod.

4. In a braking mechanism, the combination, with a braking drum, of two pairs of brake shoes, one on each side of the axis of said braking member, a pair of oppositely threaded screws and a nut therefor connecting the brake shoes of each pair, a crank on each of said nuts, an operating member, and means adapted to transmit a predetermined part of the pull of said member to each of said cranks.

5. In a braking mechanism, the combination, with a braking drum, of two pairs of brake shoes adapted to engage both sides of said drum on both sides of the axis thereof, and means for moving said shoes toward and away from said drum comprising a pair of oppositely threaded screws connected to each pair of shoes, a nut engaging the screws of each pair, a crank on each of said nuts, a floating lever, and operating member connected to an intermediate point on said lever, and rods respectively connecting said cranks with the ends of said lever.

In testimony whereof I have signed my name to this specification in the presence of two subscribing witnesses.

ALFRED HENRI CHANDESON.

Witnesses:
 HENRY W. PLUEKER,
 F. Y. ZSERNEY.